Oct. 27, 1925.  
F. G. HENRY  
1,559,095  
MACHINE FOR TEMPERING RAZOR BLADES  
Filed Feb. 2, 1921  
7 Sheets-Sheet 2
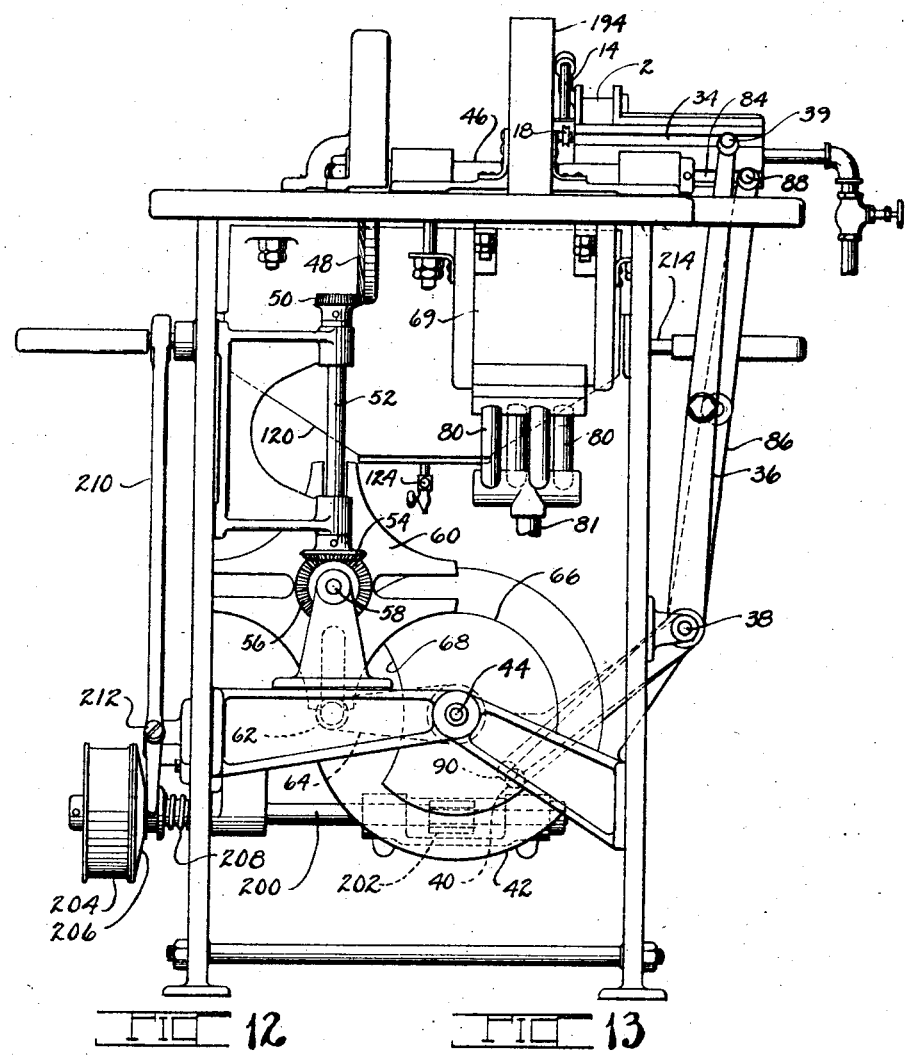
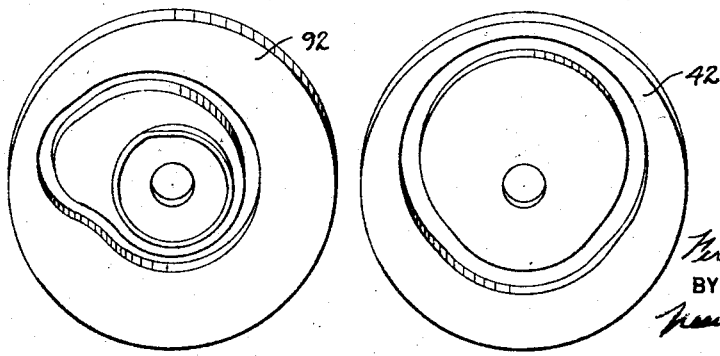
INVENTOR  
Ferdinand G. Henry  
BY  
ATTORNEYS Oct. 27, 1925.

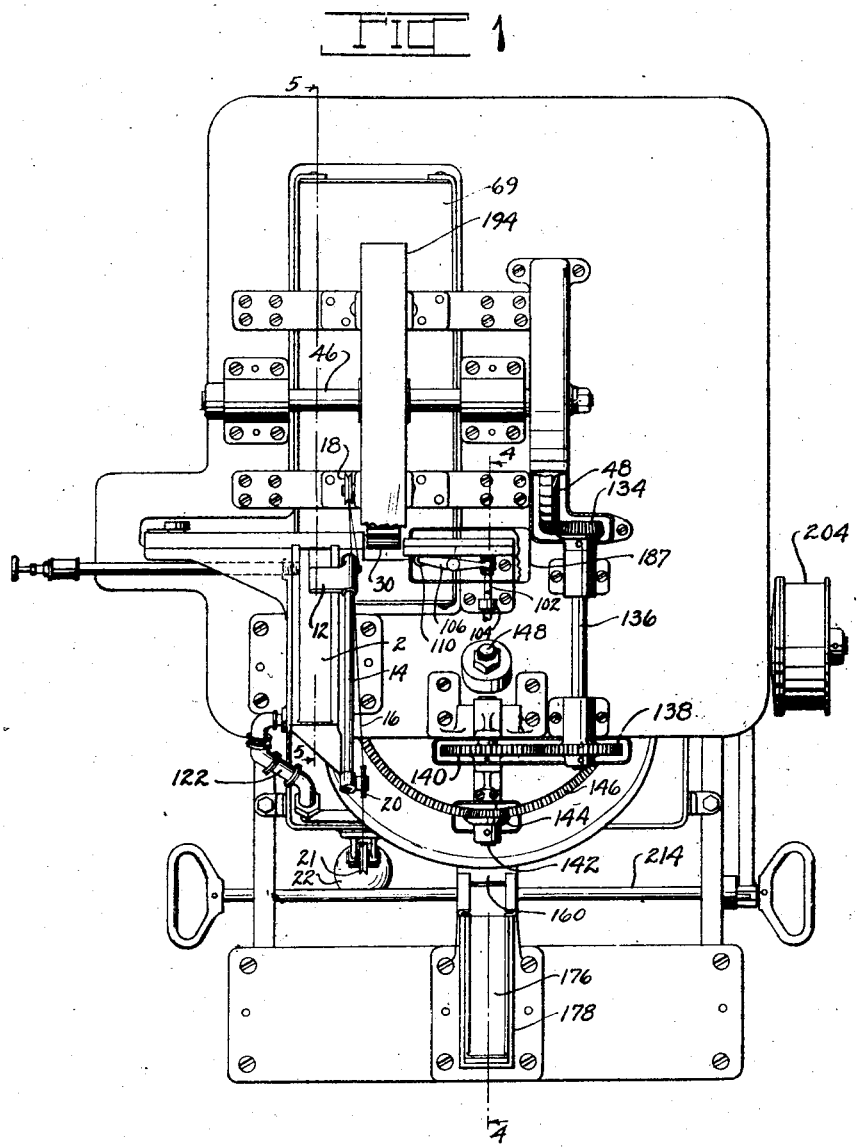

F. G. HENRY 1,559,095

MACHINE FOR TEMPERING RAZOR BLADES

Filed Feb. 2, 1921

INVENTOR
Ferdinand G. Henry
BY
ATTORNEYS

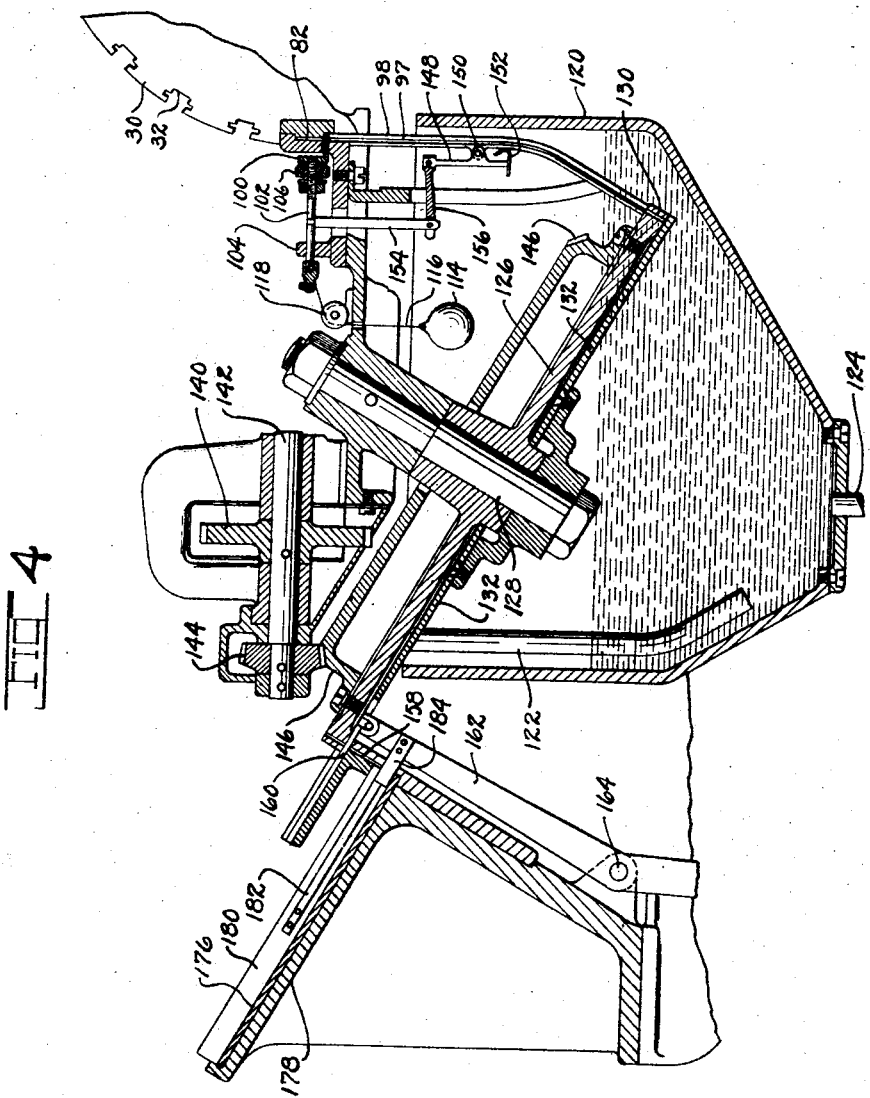

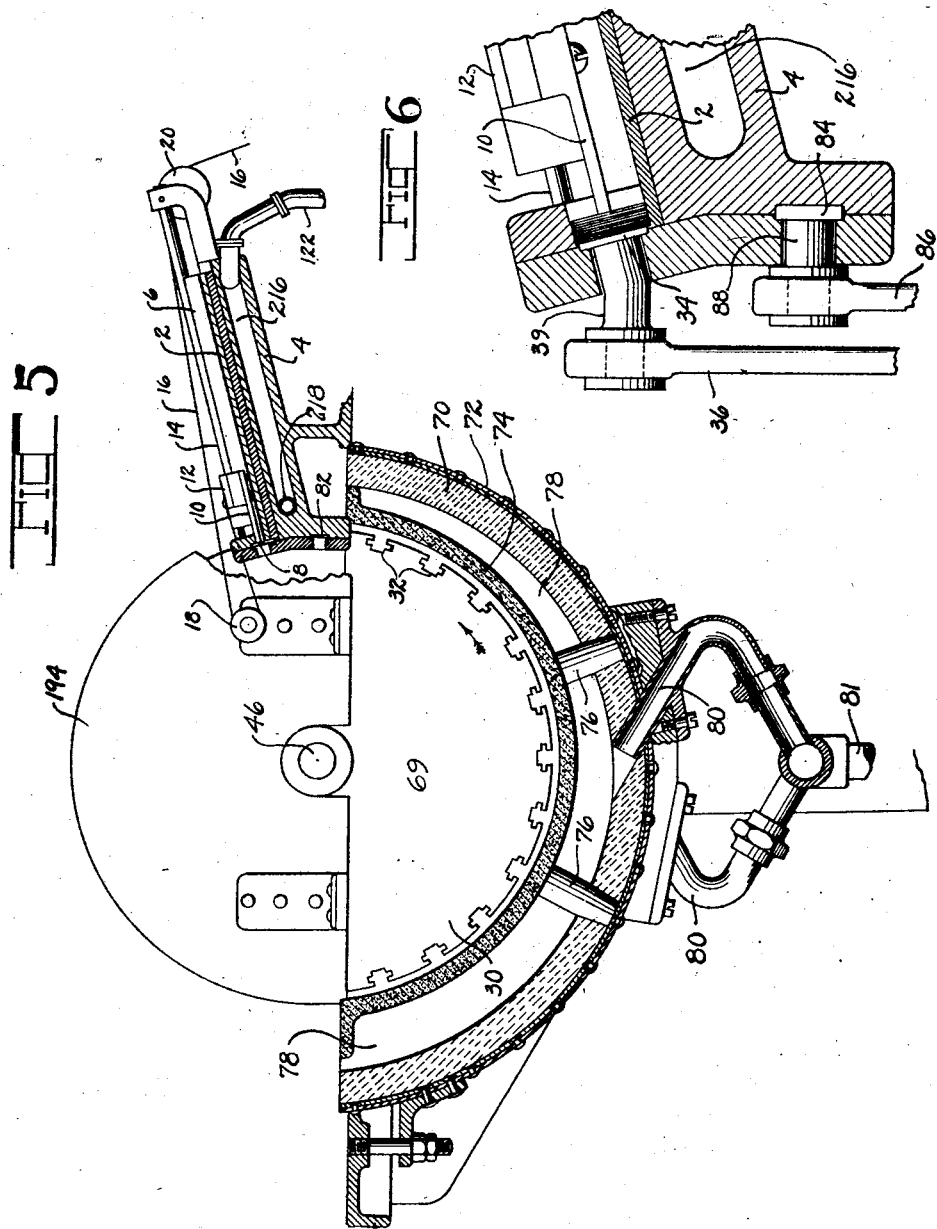

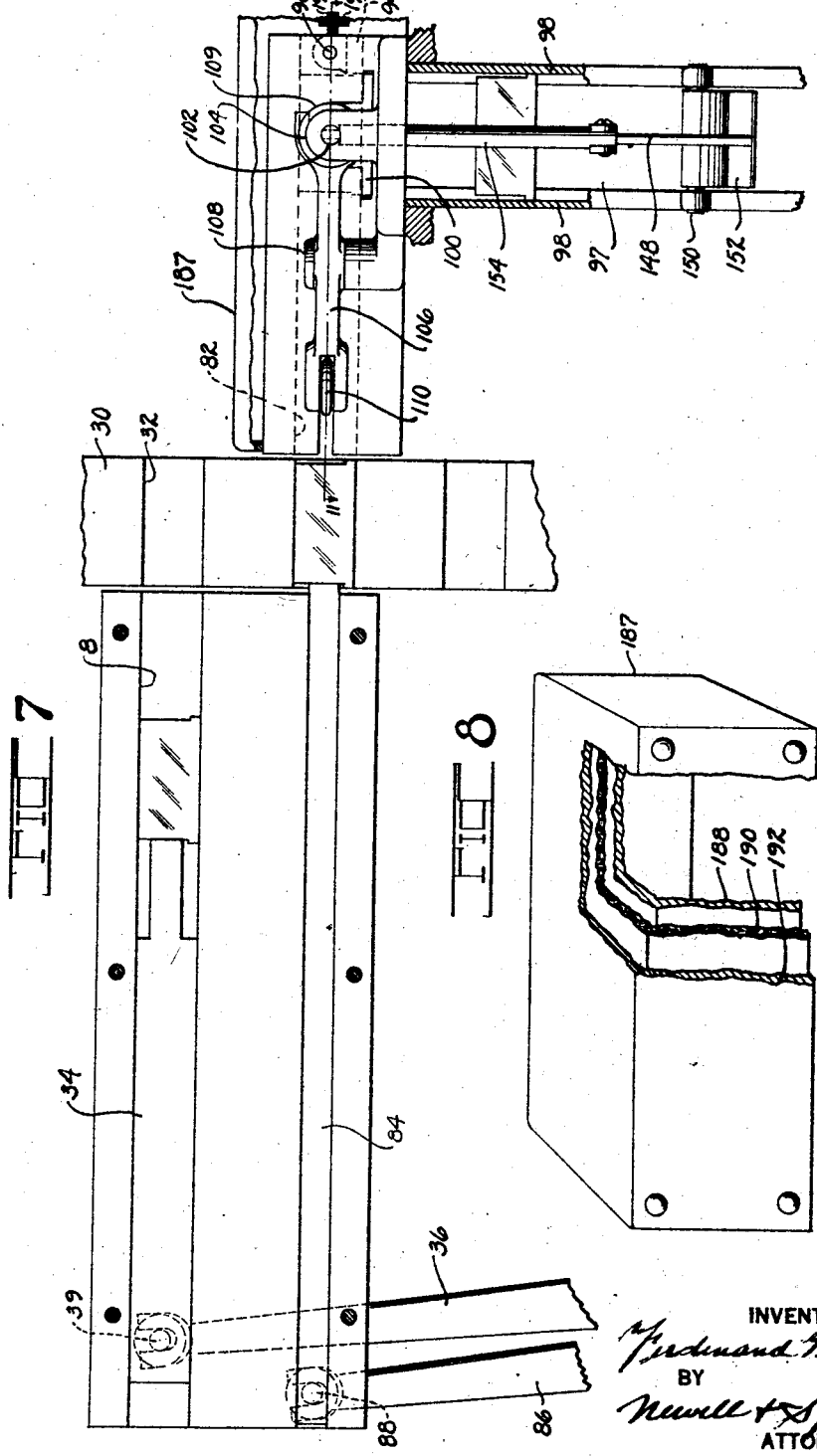

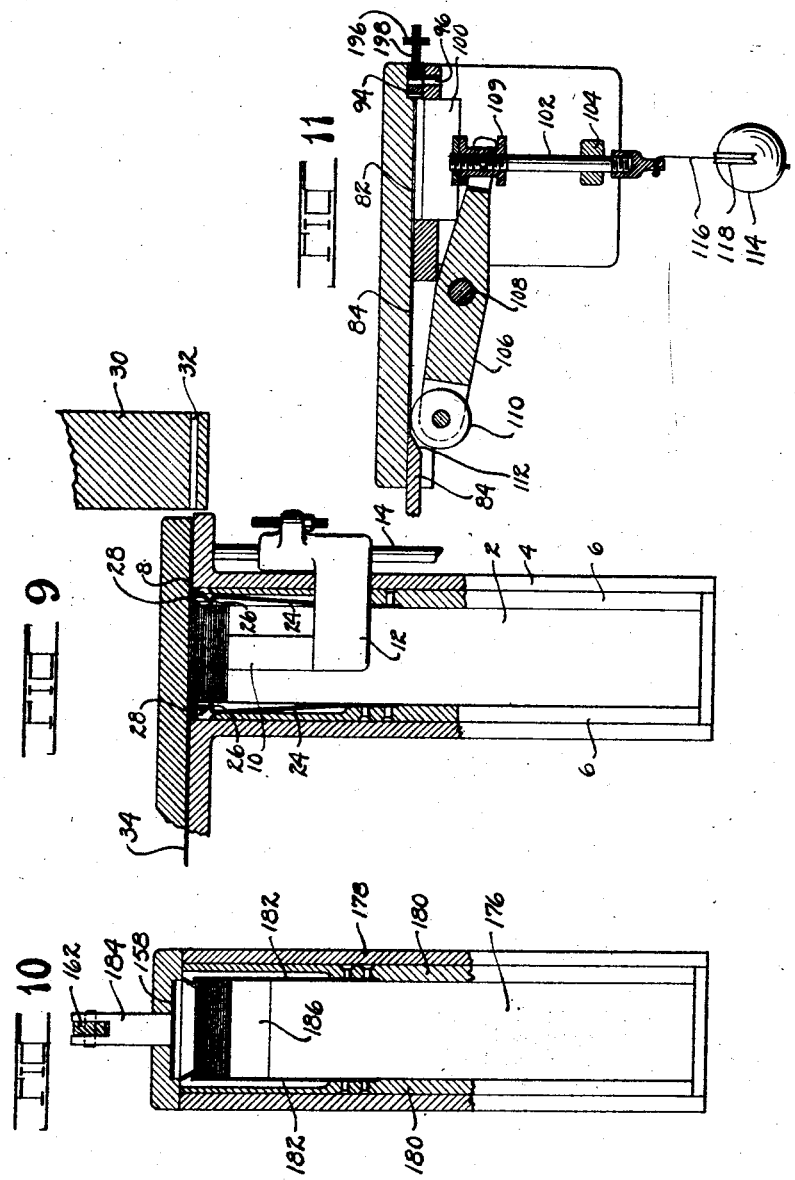

Patented Oct. 27, 1925.

1,559,095

UNITED STATES PATENT OFFICE.

FERDINAND G. HENRY, OF PHILADELPHIA, PENNSYLVANIA, ASSIGNOR, BY MESNE ASSIGNMENTS, TO WALDEN KNIFE COMPANY, OF WALDEN, NEW YORK, A CORPORATION OF NEW YORK.

MACHINE FOR TEMPERING RAZOR BLADES.

Application filed February 2, 1921. Serial No. 441,730.

*To all whom it may concern:*

Be it known that I, FERDINAND G. HENRY, a citizen of the United States, residing at 2908 North 26th St., North Philadelphia, Pennsylvania, have invented certain new and useful Improvements in Machines for Tempering Razor Blades, of which the following is a clear, full, and exact description.

This invention relates to machines for hardening metallic articles or for giving such articles the required degrees of hardness and toughness, the term tempering applying generally to such operations.

The invention is illustrated in the present application as embodied in a machine for hardening thin removable blades such as are employed in certain classes of safety razors. The invention in its broader aspects, however, is not limited to machines for tempering this particular class of blades, but certain features thereof may be embodied with advantage in machines for tempering other kinds of blades and certain features also may be applied to machines for tempering other articles.

The principal objects of the invention are to improve a construction and mode of operation of machines for tempering blades, and to produce a machine which is constructed to handle blades in large quantities efficiently and rapidly and by which the blades will be presented to the heating, cooling or other tempering mechanism in a reliable manner with the expenditure of a minimum of labor and attention.

With these objects in view certain important features of the invention relate to mechanism for handling the blades to subject the same to the action of the tempering mechanism. The blade handling mechanism is preferably constructed and arranged to act automatically to present the blades to the tempering mechanism and to deliver the blades therefrom after the tempering operation. The machine in which the invention is embodied may advantageously be provided with a blade supply holder and with a blade receiving device, and the inventor contemplates as a feature of the invention, the provision of automatically acting mechanism for taking the blades from the supply holder, presenting the blades to the tempering mechanism and delivering the same to the receiving device after being tempered.

The inventor contemplates as one of the more specific features of the invention the provision of one or more blade holding turrets for carrying the blades at certain points in the operation of presenting the blades to the tempering mechanism and delivering the same therefrom, a turret constituting a simple and efficient means for carrying the blades in a machine of this type. The blades may be applied to and taken from the turret in any suitable manner, but in order to relieve the operator of unnecessary labor and attention, it is preferred to embody in the machine automatically acting mechanism for inserting the blades in succession in the turret and for taking the blades from the turret after their presentation to the tempering mechanism.

In the preferred form of the invention, means is provided for heating the blades to a relatively high temperature, and means for thereafter cooling or chilling the blades to harden the same, and in this form of the invention one turret is provided for carrying the blades into and out of the range of action of the heating means, and another turret for carrying the blades out of the range of action of the cooling means, the blades being automatically transferred from one turret to the other.

To permit the rapid and efficient handling of the blades and reduce the labor required in treating the blades in the present form of the invention a supply galley is provided from which the blades are delivered to the mechanism for presenting the blades to the tempering mechanism, and a receiving galley is also provided into which the blades are delivered after the tempering operation. The galleys are preferably identical in construction and are removably mounted in the machine so that they may be transferred from one to the other of a series of machines for operating on blades, the receiving galley of one machine constituting the supply galley for the next machine.

The invention in addition to the features above briefly outlined, comprises various other novel and improved features, constructions and combinations of parts hereinafter described and particularly pointed out in claims, the advantages of which will be readily understood and appreciated by those skilled in the art.

The invention will be clearly understood from the accompanying drawings illustrating the invention in its preferred form and the following detailed description of the constructions therein shown.

In the drawings—

Fig. 1 is a plan view of a machine embodying the invention.

Fig. 2 is a view in rear elevation of the machine.

Fig. 4 is a detail view in vertical section taken substantially on the line 4—4 of Fig. 1.

Fig. 5 is a detail view in vertical section taken substantially on the line 5—5 of Fig. 1.

Fig. 6 is a detail view in vertical section illustrating particularly certain parts of the mechanism for handling blades.

Fig. 7 is a detail view partly in front elevation and partly in section, illustrating the blade handling mechanism.

Fig. 8 is a detail perspective view illustrating certain of the parts shown in Fig. 7.

Fig. 9 is a detail sectional view illustrating the supply galley and certain associated parts.

Fig. 10 is a detail sectional view illustrating the receiving galley and certain parts of the mechanism for projecting blades into the galley.

Fig. 11 is a detail sectional view taken substantially on the line 11—11 of Fig. 7, and Figs. 12 and 13 are perspective views illustrating respectively the cam disks for actuating certain parts of the blade handling mechanism.

Figure 3:
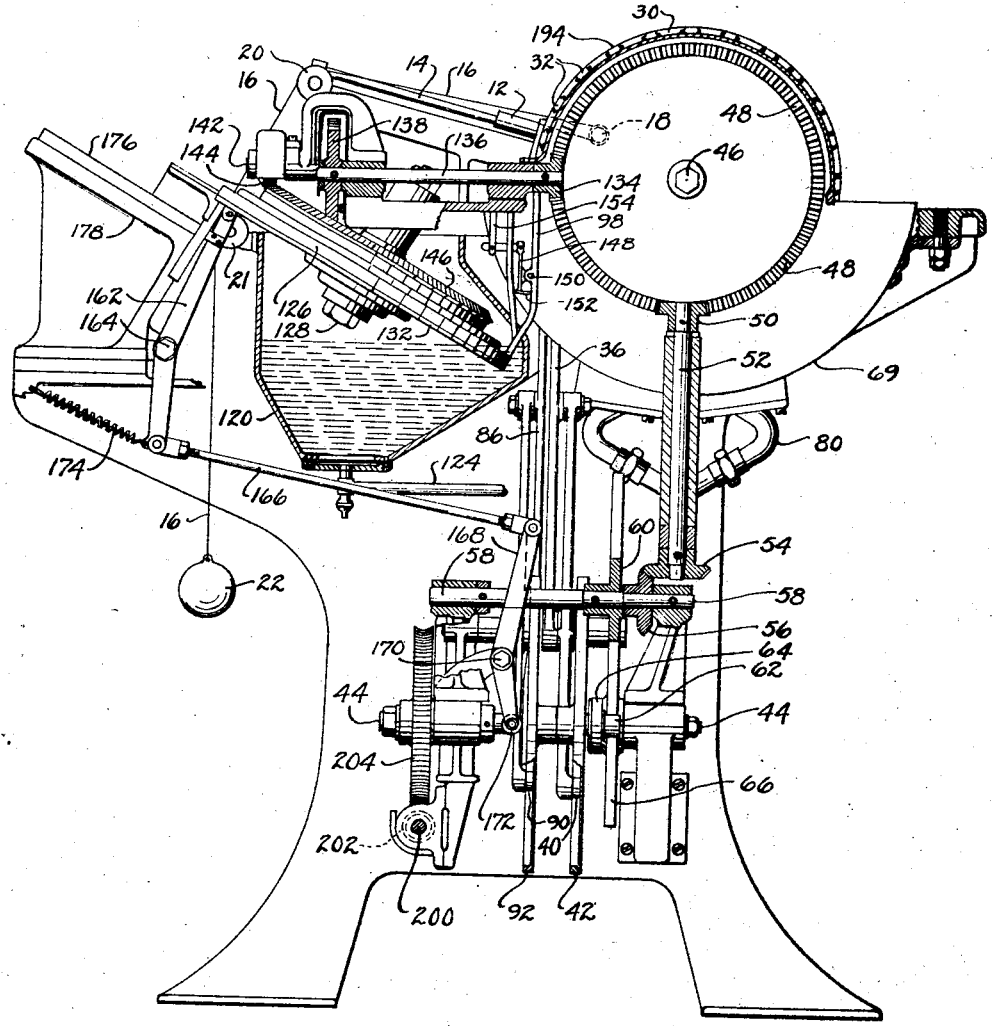
Fig. 3 is a view of the machine partly in vertical section and partly in side elevation looking from the right.

In the machine embodying the preferred form of the invention as illustrated in the drawings of the present application, a supply galley containing a pack of blades to be tempered is placed in the machine preparatory to starting the operation. The blades are then taken from the supply galley successively, are inserted in a blade holding turret and are carried by the turret into the range of action of a heating mechanism by which the blades are heated to a relatively high temperature.

In the drawings, 2 indicates the supply galley which is removably mounted in a suitable receiving groove in an arm 4 on the frame of the machine. The galley 2 is provided with lateral ribs 6 forming a central guideway in the galley adapted to receive a pack of blades placed face to face. The blades contained in the supply galley are delivered successively from the inner or rear end of the galley preferably by a movement of the pack of blades in a direction substantially normal to the blade plane. The blades are preferably delivered from the rear end of the galley into a suitable transverse guideway constructed for the passage of the blades therethrough by a movement of the blades in a direction substantially parallel with the blade plane and arranged to present the blades to the blade carrying turret. In the illustrated construction this transverse guideway indicated at 8 is formed by registering grooves in two contacting plates forming portions of the machine frame as shown in Fig. 6 and is slightly wider and thicker than the corresponding dimensions of a blade so that a blade may be passed readily therethrough endwise.

The machine illustrated is provided with mechanism arranged to act on the pack of blades in the supply galley which tends constantly to force the blades toward the rear end of the galley so as to carry the blades successively into the transverse guideway 8. This mechanism comprises an arm 10 secured to a block 12 mounted to slide longitudinally on a rod 14 suported at its end in the frame of the machine, the arm 10 being arranged to engage the forward blade of the pack in the supply galley as shown in Fig. 9. The block 12 is acted upon by a cable 16 attached at one end to the block and passing about guide pulleys 18, 20 and 21, and a weight 22 attached to the opposite end of the cable which tend to force the block 12 and the arm 10 constantly toward the rear end of the supply galley. The blades are removed successively from the rear end of the pack in the supply galley by a movement of the rear blade endwise through the guideway 8 and after the removal of each blade the next blade is carried into the guideway 8 by the action of the arm 10 on the pack of blades.

The galley 2 may advantageously be provided at its rear end with blade retaining springs as indicated at 24 having inwardly bent portions 26 arranged to engage the rear face of the rear blade of a pack in the galley to hold the pack in position. When a galley full of blades is placed in the machine to serve as the supply galley, however, the ends of the retaining springs 24 are moved downwardly so that they will not interfere with the movement of the pack of blades through the galley. To this end pins 28 having bevelled ends are mounted on the frame in position to engage bevelled ends formed on the springs 24 and force the springs outwardly when the supply galley is placed in the machine.

The blades are transferred successively from the guideway 8 into the blade carrying turret 30 having a series of blade receiving openings or slots 32, and arranged to carry the blades into the range of action of the heating mechanism. To enable the blades conveniently to be projected in succession into the blade receiving slots 32, a step by step rotary movement is imparted to the turret 30, the turret coming to rest after each period of rotation with one of the slots 32 in registration with the guideway 8. Then while the turret is at rest the blade within the guideway 8 is pushed from the guideway into the registering slot 32.

The blades are carried in succession from the guideway 8 into the slot 32 preferably by means of a blade actuator to which a reciprocatory movement is imparted in timed relation to the movement of the turret to carry the blades successively from the guideway into the turret. In the present machine, this blade actuator, indicated at 34 in the drawings, consists of a thin plate mounted to slide in the guideway 8 and arranged to carry a blade through the guideway by the engagement of its end with the end of a blade as shown in Fig. 7. The mechanism for moving the blade actuator 34 comprises a lever 36 pivoted at 38 on the frame of the machine, the upper arm of which is formed with a slot in which engages a rod or pin 39 secured to the blade actuator 34 (see Fig. 6). The lower arm of the lever 36 carries a cam roll 40 which engages in a cam groove formed in a cam disk 42 mounted on a cam shaft 44.

The turret 30 is mounted upon a shaft 46 to rotate with the shaft and is arranged with relation to suitable mechanism for heating the blades to a relatively high temperature so that the blades inserted in the blade receiving slots 32 are carried into the range of action of the heating mechanism by the rotary movement of the turret. The mechanism for imparting the rotary step by step movement above described, to the turret, comprises a bevel gear 48 secured to the shaft 46 and an intermeshing bevel gear 50 secured to the upper end of a vertical shaft 52. To the lower end of the shaft 52 is secured a bevel gear 54 meshing with a bevel gear 56 secured to a horizontal shaft 58 which is intermittently driven from the cam shaft 44 through a Geneva drive mechanism. This Geneva mechanism comprises a slotted disk 60 secured to the shaft 58 and a roll 62 secured to an arm 64 fixed to the shaft 44, the parts being arranged so that a quarter of a revolution is imparted to the shaft 58 during each rotation of the shaft 44. The disk 60 is held from rotation while the shaft 44 is making three quarters of a revolution by means of a disk 66 secured to the shaft 44 and having an arcuate periphery arranged to engage in arcuate recesses in the disk 60 to hold the latter disk from rotation and a recess 68 to receive the projecting portions of the disk 60 during the rotation of the latter disk.

The mechanism for heating the blades to a relatively high temperature may be of any suitable kind or type which has been found to give the most satisfactory results in actual practice. In the preferred form of the invention the heating means comprises a heating chamber which will for convenience be hereinafter termed a crucible into which the blades are carried by the turret 30. As shown in the drawings this crucible, which is indicated generally at 69, is semi-circular in form and the turret rotates within the same, as clearly shown in the drawings and more particularly in Fig. 5 thereof.

The crucible comprises a casing 70 preferably made of a material which is highly fire resisting and a poor conductor of heat, a double metal shell 72 surrounding said casing and a lining 74 preferably made of a material which is highly fire resisting and a good conductor of heat supported in spaced relation to the casing by means of posts 76 thereby forming a combustion chamber 78. The crucible is heated by means of a series of Bunsen burners 80 secured to the shell 72 and arranged to open into the combustion chamber 78. These burners are preferably arranged in pairs and directed angularly with relation to each other, as shown clearly in Fig. 5, so that they will heat up the lining of the crucible uniformly and are supplied with gas through a supply pipe 81.

After the blades are heated to a relatively high temperature by the passage of the same through the crucible in the manner described, they are plunged into a suitable cooling bath by which the blades are chilled to harden the same. In the present embodiment of the invention the blades in the course of transfer from the turret 30 into the cooling bath are first carried from the turret into a transverse guideway 82, similar to the guideway 8. The rotary movement of the turret carries the slots 32 successively into registration with the guideway 82 and the blades are pushed from the turret into the guideway preferably by means of a reciprocatory blade actuator. In the machine shown, this blade actuator indicated at 84 in the drawing is mounted to slide longitudinally in suitable guides in the frame and is arranged so that its end will engage the ends of the blades located in the slots in the turret 30, as shown in Fig. 7. The mechanism for actuating the slide 84 comprises a lever 86 pivoted at 38 on the frame, the upper arm of which is provided with a slot in which engages a rod or pin 88 secured to the slide 84. The lower arm of the lever 86 carries a cam roll 90 arranged to engage in a cam groove formed in a cam disk 92 secured to the cam shaft 44.

By movement of the slide 84 a blade is carried from the turret into the guideway 82 and through the latter guideway into the position shown in dotted lines, Fig. 7, the movement of the blade being limited by its engagement with a stop lever 94 pivoted at 96 on the frame. When a blade reaches this position it is located over the upper end of a guideway 97 formed by grooves in vertically extending members 98 arranged to receive the ends of a blade as shown in Fig. 7.

If the guideway 97 were open during the movement of a blade along the guideway 82 to the guideway 97, the right hand end of the blade which reaches the guideway 97 first would tend to drop before the whole blade was over the latter guideway. This would often cause the blades to jam in the guideway 97. To avoid this difficulty, as a blade is carried along the guideway 82 toward the guideway 97 the upper end of the latter guideway is closed by a plate 100 mounted in suitable guides to slide in directions substantially normal to the plane of the guideway 82. The plate 100, which is angular in cross section, is secured to the rear end of a rod 102 mounted to slide in an opening in a projection 104 on the frame. As a blade is carried through the guideway 82 to the guideway 97 the plate 100 is positioned to close the upper end of the guideway 97 so that the blade is carried onto the upper surface of the plate. After the blade is carried onto the plate, the plate is moved forwardly, allowing the blade in the guideway 82 to drop downwardly through the guideway 97. The blade then will be positioned squarely with relation to the guideway 97 as it starts to drop therethrough. The mechanism for actuating the plate 100 in this manner in the present machine comprises a lever 106 pivoted at 108 on the frame, the forked right hand end of which engages between flanges on a collar 109 secured to the rod 102 and the left hand end of which carries a roll 110 arranged to engage the slide 84. The slide 84 is formed with a cam 112 which engages the roll 110 and actuates the lever 106 to move the plate 100 rearwardly to close the upper end of guideway 97 during the right hand movement of the slide 82 before the blade actuated by the slide reaches the guideway 97. The rod 102 is actuated to move the plate 100 forwardly as the slide 84 moves back to the left by means of a weight 114 connected with the rod by means of a cable 116 passing over a guide roll 118.

The blades as they drop by gravity through the guideway 97 plunge into a suitable cooling bath by which the blades are chilled to impart the proper degree of hardness to the metal. The movement of the blades into the cooling bath under gravitational action is of advantage in that it causes the quick chilling of the blades, which is important in imparting the proper degree of hardness thereto.

In the illustrated construction the members 98 extend downwardly into a tank 120 containing a suitable liquid for cooling the blades. Preferably a bath consisting of a quantity of water with a layer of oil floating on the upper surface thereof is employed since this has been found to give the proper degree of hardness and toughness to the blades. Preferably, also, water is supplied continuously to the tank through a supply pipe 122 and is drawn off from the tank at the same rate through a waste pipe 124 thereby maintaining the water in the tank at a substantially constant temperature.

The blades pass downwardly from the lower end of the guideway 97 into a second rotary turret 126 by which the blades are removed from the bath. The turret 126 is mounted on a shaft 128 to rotate in a plane inclined to the horizontal as shown clearly in Figs. 3 and 4, the lower part of the turret dipping into the bath in the tank 120 as shown in these figures. The lower ends of the members 98 are located just above the upper face of the turret 126 and the turret is formed with a series of slots 130 in which the blades are deposited from the guideway 97. The slots 130 are closed at their lower ends by means of a non-rotary plate 132 secured to the shaft 128.

The turret 126 is given a step by step movement to bring the slots 130 successively into position to receive the blades from the guideway 97 through a driving mechanism connecting the bevel gear 48 with the turret. This driving mechanism comprises a bevel gear 134 secured to the rear end of a shaft 136 and meshing with the bevel gear 48, a spur gear 138 secured to the forward end of the shaft 136, a spur gear 140 secured to a shaft 142 and meshing with the gear 138, a bevel gear 144 also secured to the latter shaft and a bevel gear 146 secured to the turret and meshing with the bevel gear 144.

After a blade is released by the plate 100, the blade in dropping through the guideway 97, is liable to become displaced so that its longitudinal axis lies oblique to the guideway to such a degree that the blade will jam in the guideway. To offset this tendency in the machine shown, a straightening device is mounted in the guideway, preferably about midway between the top and bottom thereof.

In the present construction the straightening device comprises a lever 148 pivoted at 150 on the frame and carrying at its lower end a bent plate 152 arranged to enter between the members 98 so as to engage the lower edge of a blade passing downwardly through the guideway 97.

As the blade drops through the guideway 97 upon the release of the same by the plate 100 the blade is caught by the plate 152 and if displaced so that it lies obliquely to the guideway, the blade is straightened by the latter plate, the engagement of the blade with this plate causing the blade to assume a position with its longitudinal axis substantially perpendicular to the guideway. The blade is thereafter released by the plate 152 and continues its movement downwardly through the guideway 97.

The lever 148 is actuated to carry the plate 152 into blade engaging position as the plate 100 is moved forwardly to release a blade and as the plate 100 is moved rearwardly to close the upper end of the guideway 97 the lever 148 is actuated to carry the plate 152 out of blade engaging position, allowing the blade held thereby to continue its movement downwardly through the guideway 97. The lever 148 is actuated in this manner from the rod 102 by means of a rod 154 rigidly secured at its upper end to the rod 102 and a link 156 connecting the lower end of the rod 154 with the lever 148.

The blades deposited in the slots in the turret 132 after being carried from the cooling bath by the rotation of the turret are deposited in a receiving galley preferably having the same construction as the supply galley 2. The blades preferably are dropped successively from the slots in the turret through a guideway 158, the upper end of which is normally closed by a slide 160, the guideway being located in line with the slots 130. During the rotation of the turret the upper end of the guideway 158 is closed by the slide 160. When the turret has come to rest with one of the slots 130 located over the guideway 158 the slide 160 is retracted, allowing the blade in the slot to drop downwardly through the guideway after which the slide is advanced to its initial position. The slide is actuated in this manner by means of a lever 162 pivoted at 164 on the frame, the upper end of which is slotted to receive a pin secured in the slide. The lower arm of the lever 162 is connected by a link 166 with a cam lever 168 pivoted at 170 on the frame and carrying a cam roll 172 arranged to engage a cam formed on the lateral face of the cam disk 92. The lever 162 is acted upon by a coiled spring 174 which swings the lever in one direction and also maintains the cam roll 172 in engagement with the cam disk 92.

The blades after dropping into the lower end of the guideway 158 are projected from said guideway into a receiving galley 176. This galley preferably is substantially identical in construction with that of the galley 2 (see Fig. 10) and is removably mounted in a groove in an arm 178 on the frame of the machine. The galley is provided with lateral ribs 180 forming a central guideway for a pack of blades and carries at its rear ends blade retaining springs 182 similar to the springs 24 of the supply galley, these springs being free to assume their normal blade retaining positions as shown in Fig. 10.

The blades are pushed from the guideway 158 by movement thereof in a direction substantially normal to the blade plane by means of a push bar 184 secured to the lever 162 and operating in an opening in the frame of the machine. As the blades are carried from the guideway 158 by the push bar, the ends of the blades engage the inclined ends of the retaining springs 182 and push back the ends of the springs until the blade is carried beyond the inwardly bent portions of the springs, the springs then springing back to their normal blade holding positions. To hold the pack of blades properly in the receiving galley a weight 186 preferably consisting of a metal block arranged to fit in the guideway in the galley is placed in the galley so as to engage the forward blade of the pack, this weight sliding along the galley as the blades are carried successively into the same.

To prevent the blades from becoming chilled during their passage through the guideway 82, the part of the frame in which this guideway is formed is surrounded by a heat retaining casing 187 shown in detail in Fig. 8. This casing comprises an inner wall 188 preferably made of copper, a central wall 190 preferably made of asbestos and spaced from the wall 188, and an outer wall 192 preferably made of sheet iron. One end of the casing extends over the crucible as shown clearly in Fig. 1 and an opening is formed from the crucible into the interior of the casing between the walls 188 and 190 so that that part of the frame in which the guideway 82 is formed is heated to a very high temperature.

The upper part of the turret 30 is enclosed by a semi-circular casing 194 to prevent the turret from cooling rapidly after emerging from the crucible. The upper portion of the turret is kept comparatively hot although the temperature in the casing 194 is not as hot as that in the crucible. Thus the passage of the blades first through the casing 194 and then through the crucible produces a gradual heating of the blades which is found to be of advantage in giving the blades the proper temper.

The stop lever 94 insures the positioning of a blade properly to drop through the chute 97 before the plate 100 is moved forwardly and also eliminates the danger of injury to the blades or the parts of the machine, should there be any overthrow of the slide 84. In case there is a certain amount of overthrow in the movement of the slide 84 to the right, the lever 94 yields as a blade engages the same at the end of the movement of the slide. Then as the slide retracts, the lever swings back to its normal position carrying the blade to the left into position directly over the chute 97, the movement of the lever being limited by its engagement with a suitable stop on the frame. To insure the movement of the lever back to its normal position, the lever is acted upon by a weight 196 threaded on a stud 198 secured in the lever.

The cam shaft 44 is driven from a shaft 200, which constitutes the main driving shaft of the machine, through a worm 202 secured to the latter shaft and a worm wheel 204 secured to the shaft 44 and meshing with the worm. The driving shaft 200 carries a belt pulley 204 mounted to rotate loosely thereon and adapted to be clutched to the shaft by means of a friction clutch. The inner face of the pulley 204 forms one member of this clutch and the other member thereof consists of a disk 206 mounted to rotate with the shaft 200 and movable longitudinally of the shaft into and out of engagement with the clutch face of the driving pulley. The disk 206 is normally held in engagement with the driving pulley 204 by means of a coiled spring 208. The means for moving the disk 206 to disengage the clutch comprises a lever 210 pivoted at 212 on the frame, the lower end of which engages in a groove in the hub of said disk. The upper end of the lever 210 is engaged between abutments carried by a rod 214 mounted for longitudinal movement in suitable guides in the frame and having handles secured to the opposite ends thereof. Thus the disk 206 may be disengaged from the pulley 204 by the longitudinal movement of the rod 214 which may be operated conveniently from either side of the machine.

To prevent the supply galley from becoming hot and thus causing difficulty in the handling of the same, the arm 4 in which the supply galley is located is maintained at a comparatively low temperature. To this end the arm is provided with a chamber 216 into which water is delivered by means of an inlet pipe 218. The water is discharged from the chamber 216 through the pipe 122 which supplies water to the tank 120.

It will be noted from an inspection of Figs. 1, 4, 5, 7 and 9 that the turrets 30 and 126 comprise unitary rigid structures in which are formed blades receiving slots adapted to hold the blades without clamping the same, the walls of the slots being relatively fixed and the blades merely resting in the slots. As clearly shown in Figs. 4 and 5, the slots 32 in the turret 30 are so constructed that when a blade is inserted therein the greater part of the side faces of the blade are exposed, giving a large area of contact for the heated air within the crucible.

It is to be understood that the invention is not limited to the particular construction and arrangement of parts illustrated in the present application, but that the invention may be embodied in other forms within the scope of the claims.

What is claimed as new is:

1. A machine for tempering blades having in combination tempering means, a blade holding turret comprising a unitary rigid structure mounted for movement to move the blades carried thereby relatively to the tempering means, blade holding slots having relatively fixed walls formed in said turret structure, and arranged to hold the blades without clamping the same, means for inserting blades in the slots and means for rotating the turret.

2. A machine for tempering blades having in combination tempering means, a rotary blade holding turret comprising a unitary rigid structure mounted for movement to move the blades carried thereby relatively to the tempering means, blade holding slots having relatively fixed walls formed in the turret structure and arranged to hold the blades without clamping the same, automatic means for inserting blades in succession in said slots, and means for rotating the turret.

3. A machine for tempering blades having in combination tempering means, a rotary blade holding turret arranged to carry thin metallic blades and mounted for movement to move the blades carried thereby relatively to the tempering means, blade holding means carried by the turret, positively acting means for removing blades from the holding means, and means for rotating the turret.

4. A machine for tempering blades having in combination tempering means, a rotary blade holding turret comprising a unitary rigid structure mounted for movement to move the blades carried thereby relatively to the tempering means, blade holding slots having relatively fixed walls formed in said turret structure and arranged to hold blades without clamping the same, a supply galley, means for transferring blades in succession from the supply galley to the turret, and means for rotating the turret.

5. A machine for tempering blades having in combination tempering means, a rotary blade holding turret arranged to carry thin metallic blades and mounted for movement to move the blades carried thereby relatively to the tempering means, blade holding means carried by the turret, automatic means acting positively to remove blades in succession from the turret and means for rotating the turret.

6. A machine for tempering blades having in combination tempering means, a rotary blade holding turret mounted for movement to move blades carried thereby relatively to the tempering means, blade holding means carried by the turret, a receiving galley, means for transferring blades in succession from the turret to the receiving galley and means for rotating the turret.

7. A machine for tempering blades having in combination tempering means, a rotary blade holding turret comprising a unitary rigid structure mounted for movement to move blades carried thereby relatively to the tempering means, blade holding slots having relatively fixed walls formed in said turret structure and arranged to hold the blades without clamping the same, a supply galley, means for automatically transferring blades in succession from the supply galley to the slots and for removing blades from said slots.

8. A machine for tempering blades having in combination tempering means, a rotary blade holding turret mounted for movement to move blades carried thereby relatively to the tempering means, blade holding means carried by the turret, a receiving galley, means for automatically inserting blades in the holding means and for transferring blades in succession from the holding means to the receiving galley.

9. A machine for tempering blades having in combination a supply galley, a receiving galley and means for taking blades in succession from the supply galley, tempering the same and inserting them in the receiving galley after the tempering operation.

10. A machine for tempering blades having in combination a supply galley, a receiving galley, tempering means, and automatic mechanism for taking blades in succession from the supply galley, subjecting the blades to the action of the tempering means and inserting the same in the receiving galley after the tempering operation.

11. A machine for tempering blades having in combination heating means, a turret for moving blades relatively to the heating means, cooling means, a turret for moving blades relatively to the cooling means, and means for transferring blades in succession from the first to the second turret.

12. A machine for tempering blades having in combination heating means, a turret for moving blades relatively to the heating means, means for inserting blades in succession into said turret, cooling means, a turret for moving blades relatively to said cooling means, and means for transferring the blades in succession from the first to the second turret.

13. A machine for tempering blades having in combination heating means, a turret for moving blades relatively to the heating means, cooling means, a turret for moving blades relatively to the cooling means, means for causing the discharge of the blades in succession from the second turret.

14. A machine for tempering blades having in combination heating means, a turret for moving blades relatively to the heating means, means for inserting blades in succession in the first turret, cooling means, means for transferring the blades in succession from the first to the second turret, and means for causing the discharge of the blades in succession from the second turret.

15. A machine for tempering blades having in combination a crucible, means for heating the crucible, a turret for carrying blades in succession through the crucible, a cooling bath, a turret for carrying blades in succession through the cooling bath and means for transferring the blades in succession from the first to the second turret.

16. A machine for tempering blades having in combination a liquid bath, a turret for carrying blades in succession through the liquid bath, blade holding means carried by the turret, and means for rotating the turret.

17. A machine for tempering blades having in combination a crucible, means for heating the crucible, a turret for carrying blades in succession through the crucible, a cooling bath, a turret for carrying blades in succession through the cooling bath and means for transferring the blades in succession from the first to the second turret.

18. A machine for tempering blades, having in combination, means for heating blades, a cooling bath, a chute arranged to guide the blades and to hold the same in a definite angular position through which the blades drop into said cooling bath and means for causing the transfer of the blades from said heating means to said chute.

19. A machine for tempering blades, having in combination, means for heating blades, a cooling bath, a chute through which the blades drop into said cooling bath, means for causing the transfer of the blades from said heating means to said chute, and means for removing the blades from said bath.

20. A machine for tempering blades, having in combination, means for heating the blades, a cooling bath, a chute through which the blades drop into said cooling bath, means for causing the transfer of blades from said heating means to said chute, a rotary turret arranged to receive the blades from said chute, and means for rotating the turret.

21. A machine for tempering blades, having in combination, means for heating the blades, a cooling bath, a chute through which the blades drop into said cooling bath, and a guideway discharging directly into the chute through which the blades are carried in transferring the same from the heating means to the chute.

22. A machine for tempering blades, having in combination, a rotary turret, a guideway arranged to receive blades from said turret and through which the blades drop by gravity, a receiving galley, and means for carrying the blades from said guideway into the receiving galley.

23. A machine for tempering blades, having in combination a blade guideway, blade heating means, a rotary current arranged to receive blades from said guideway and to carry the same into the range of action of said heating means, means for moving the blades through the guideway into the turret, a cooling bath, a chute through which the blades drop into said cooling bath, a guideway arranged to receive blades from said turret and leading to the chute, means for moving the blades from the turret through the guideway to the chute, and a second turret arranged to receive blades from said chute and to carry the same from the cooling bath.

24. A machine for tempering blades, having in combination a supply galley, a guideway into which the blades are transferred in succession from said supply galley, blade heating means, a turret arranged to receive blades from said guideway and to carry the same into the range of action of the heating means, means for moving the blades through the guideway into the turret, a cooling bath, a chute through which the blades drop by gravity into the cooling bath, a guideway arranged to receive blades from the turret and leading to the chute, means for moving the blades from the turret through the guideway to the chute, a turret arranged to receive the blades from said chute and to carry the same from the cooling bath, a receiving galley, and means for transferring the blades from the second turret to the receiving galley.

25. A machine for tempering blades, having in combination a chute through which blades drop under the action of gravity, a guideway leading to the chute and extending transversely thereof, means for closing the upper end of the chute at the point where the guideway discharges into the chute before a blade reaches the same in its passage through the guideway and for thereafter opening the chute to allow the blade to drop therethrough, and means for moving blades through the guideway and across the chute closing means to a point directly over the chute.

26. A machine for tempering metal articles, having in combination, means for heating such articles, a cooling bath, a chute arranged to guide the articles and to hold the same in a definite angular position through which the articles drop under the action of gravity into said cooling bath, and means for causing the transfer of the articles from said heating means to said chute.

27. A machine for tempering metal articles, having in combination a supply galley, a receiving galley, means for taking the articles in succession from the supply galley, tempering the same and inserting them in the receiving galley after the tempering operation.

28. A machine for tempering metal articles, having in combination tempering means, an article holding turret comprising a unitary rigid structure mounted for movement to move the articles carried thereby relatively to the tempering means, article holding slots having relatively fixed walls formed in said turret structure and arranged to hold blades without clamping the same, means for inserting articles in the slots, and means for rotating the turret.

29. A machine for tempering metal articles, having in combination tempering means, a rotary article holding turret arranged to carry thin metallic articles and mounted for movement to move the articles carried thereby relatively to the tempering means, article holding means carried by the turret, positively acting means for removing articles from the holding means, and means for rotating the turret.

30. A machine for tempering blades, having in combination a blade supply holder, a blade receiving device arranged to receive and hold in position a series of blades placed face to face, tempering mechanism and automatically acting mechanism for taking the blades from the supply holder, presenting the blades to the tempering mechanism and delivering the same to the receiving device after being tempered.

31. A machine for tempering metal articles, having in combination a holder adapted to hold a supply of such articles, a receiving device adapted to receive a number of such articles and to hold the same in definite relative positions, tempering mechanism and automatically acting means for taking the articles from the supply holder, presenting the articles to the tempering mechanism and delivering the same each in a definite position to the receiving device after being tempered.

32. A machine for handling articles having, in combination, a turret provided with transverse article receiving slots having relatively fixed side walls constructed to hold articles without clamping the same, a guideway arranged to deliver articles into the slots in the turret from one side thereof, and means for rotating the turret to bring the slots successively into position to receive articles from the guideway.

33. A machine for handling articles having, in combination, a rotary turret provided with a series of article holding devices, a guideway arranged to receive articles from the turret and constructed to hold articles in definite positions while passing through the same, and means for rotating the turret to bring the article holding devices successively into positions to discharge the articles into the guideway.

34. A machine for handling articles having, in combination, a rotary turret, a series of article holding devices carried by the turret, a guideway arranged to deliver articles into the turret, a second guideway arranged to receive articles from the turret, said guideways being constructed to hold articles in definite positions while passing through the same, and means for rotating the turret to bring the article holding devices successively into position to receive articles from the first guideway and to discharge articles into the second guideway.

35. A machine for tempering blades, having, in combination, a heating chamber, means for heating the chamber arranged to produce a higher temperature in one portion of said chamber than in another portion thereof, and a rotary blade holding turret arranged to carry the blades first through the portion of the chamber in which the lower temperature is produced and then through the portion of said chamber in which the higher temperature is produced to heat up the blades gradually.

36. A machine for tempering blades having in combination tempering means, a solid disk-like turret arranged with relation to the tempering means to leave both sides of the turret exposed to the action of said means and provided with slots extending through the turret from one side to the other thereof and adapted to hold blades therein without clamping the same and means for rotating the turret to move the blades carried thereby relatively to the tempering means.

37. A machine for tempering blades having in combination tempering means, a rotary solid disk-like turret arranged with relation to the tempering means to leave both sides of the turret exposed to the action of said means and provided with slots extending through the turret from one side to the other thereof and adapted to hold blades therein without clamping the same and arranged for the insertion and removal of blades from the side of the turret and means for rotating the turret to move the blades carried thereby relatively to the tempering means.

38. A machine for tempering blades having, in combination, a rotary, solid, disk-like turret mounted to rotate substantially in a vertical plane, and having blade-holding slots extending transversely through the turret from one side to the other thereof, in which the blades rest by gravitational action, a crucible surrounding a portion of said turret and leaving both sides of the turret exposed to the heat within the crucible, and means for heating the crucible.

Signed at New York city this 1st day of February 1921.

FERDINAND G. HENRY.